(12) United States Patent
Tokito (10) Patent No.: US 10,328,522 B2
(45) Date of Patent: Jun. 25, 2019

(54) LASER PROCESSING APPARATUS CAPABLE OF RETRACTING PROCESSING NOZZLE UPON DETECTION OF POWER OUTAGE

(71) Applicant: FANUC CORPORATION, Minamitsuru-gun, Yamanashi (JP)

(72) Inventor: Hiroaki Tokito, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 53 days.

(21) Appl. No.: 14/665,586

(22) Filed: Mar. 23, 2015

(65) Prior Publication Data

US 2015/0266133 A1 Sep. 24, 2015

(30) Foreign Application Priority Data

Mar. 24, 2014 (JP) .................................. 2014-060677

(51) Int. Cl.
*B23K 26/00* (2014.01)
*B23K 26/02* (2014.01)
(Continued)

(52) U.S. Cl.
CPC ........ *B23K 26/0892* (2013.01); *B23K 26/048* (2013.01); *B23K 26/083* (2013.01); *B23K 26/70* (2015.10)

(58) Field of Classification Search
CPC .............. B23K 26/083; B23K 26/0892; B23K 26/0869; B23K 26/0876; B23K 26/0884; B23K 26/048; B23K 26/70
USPC ... 219/69.16, 121.82, 124.02, 121.6, 121.65, 219/121.67, 121.73, 121.78
See application file for complete search history.

(56) References Cited

U.S. PATENT DOCUMENTS 6,870,130 B2 3/2005 Yamazaki
2003/0183608 A1 10/2003 Yamazaki
(Continued)

FOREIGN PATENT DOCUMENTS

CN 1759971 4/2006
CN 201158749 12/2008
(Continued)

OTHER PUBLICATIONS

German Office Action issued in German Patent Application No. 10 2015 003 435.9 dated May 20, 2016.
(Continued)

*Primary Examiner* — Michael G Hoang
(74) *Attorney, Agent, or Firm* — RatnerPrestia (57) ABSTRACT

A laser processing apparatus including a processing nozzle for irradiating a workpiece with laser beam; an actuator for moving the processing nozzle relative to the workpiece; a distance detector for detecting a gap between the processing nozzle and the workpiece; a power abnormality detecting section for detecting an abnormality in electric power supplied from a power supply unit; a gap control section for controlling the actuator based on a detected value obtained by the distance detector, so as to perform a gap control for adjusting the gap to a target value, during execution of laser processing; and a change control section for maintaining the gap control in an enabled state until a power abnormality is detected by the power abnormality detecting section during execution of laser processing, and for disabling the gap control when a power abnormality is detected by the power abnormality detecting section during execution of laser processing.

2 Claims, 5 Drawing Sheets

(51) Int. Cl.
*B23K 26/08* (2014.01)
*B23K 26/04* (2014.01)
*B23K 26/70* (2014.01)

(56) References Cited

U.S. PATENT DOCUMENTS

| | | | |
|---|---|---|---|
| 2006/0081575 A1 | 4/2006 | Egawa | |
| 2007/0228835 A1* | 10/2007 | Varzhabedian | H02J 7/027 307/66 |
| 2009/0082900 A1* | 3/2009 | Akaiwa | G05B 19/4097 700/178 |

FOREIGN PATENT DOCUMENTS

| | | |
|---|---|---|
| CN | 101393448 | 3/2009 |
| CN | 202934146 | 5/2013 |
| DE | 40 35 403 A1 | 5/1992 |
| JP | H 03-044388 Y | 11/1988 |
| JP | 2751766 B | 6/1994 |
| JP | 11-123573 | 5/1999 |
| JP | 2000137511 | 5/2000 |
| JP | 2004001067 | 1/2004 |
| JP | 2007253221 | 10/2007 |

OTHER PUBLICATIONS

Second Chinese Office Action for Chinese Application No. 201510127902.6, dated Nov. 17, 2016, including English translation, 12 pages.

* cited by examiner

LASER PROCESSING APPARATUS CAPABLE OF RETRACTING PROCESSING NOZZLE UPON DETECTION OF POWER OUTAGE

BACKGROUND OF THE INVENTION

1. Field of the Invention

The present invention relates to a laser processing apparatus capable of retracting a processing nozzle when electric power supply to a laser processing unit is cut off due to a power outage, etc.

2. Description of the Related Art

Generally, in laser processing, a distance between a nozzle and a workpiece is detected by a gap sensor, and the workpiece is processed by performing a gap control based on the detected value of the gap sensor. Thus, if an abnormality occurs in supply power due to a power outage, etc., the gap sensor may malfunction, and the gap control may be performed based on an erroneously detected value from the gap sensor, which may cause the processing nozzle to hit the workpiece.

It is known to provide an apparatus wherein provisions are made to prevent a processing head from dropping and hitting the workpiece when power supply to a laser processing unit is cut off due to a power outage, etc. For example, Japanese Examined Utility Model Publication No. H03-44388 (JP H03-044388 Y) discloses an apparatus in which a hydraulic cylinder is provided in the lower part of a ball screw for vertically moving a processing nozzle, and an engaging member is shifted upward by spring force when hydraulic oil is evacuated from a cylinder chamber of the hydraulic cylinder in the event of a power outage. In this configuration, an engaging portion of the engaging member engages with a mating portion of a mating member in the lower part of the ball screw, so as to prevent the ball screw from rotating.

On the other hand, Japanese Patent No. 2751766 (JP 2751766 B) discloses an apparatus in which a stopper is provided to protrude from a movable part formed integrally with a processing head and another stopper for adjusting a processing position is provided below the protruding stopper. In this configuration, when the processing head drops in the event of a power outage, the stoppers are abutted to each other, and thereby prevent the processing head from hitting the workpiece.

SUMMARY OF THE INVENTION

Since the above conventional apparatus are constructed to prevent the dropping of the processing head by mechanical means, it is required to provide an extra component, which leads to an increase in cost.

One aspect of the present invention provides a laser processing apparatus comprising a processing nozzle configured to irradiate a workpiece with laser beam; an actuator configured to move the processing nozzle and the workpiece relative to each other; a distance detector configured to detect a gap between the processing nozzle and the workpiece; a power abnormality detecting section configured to detect an abnormality in electric power supplied from a power supply unit; a gap control section configured to control the actuator based on a detected value obtained by the distance detector, so as to perform a gap control for adjusting the gap to a target value, during execution of laser processing; and a change control section configured to maintain the gap control in an enabled state until a power abnormality is detected by the power abnormality detecting section during execution of laser processing, and to disable the gap control when a power abnormality is detected by the power abnormality detecting section during execution of laser processing.

In the laser processing apparatus according to the above aspect, since provisions are made to maintain the gap control in an enabled state until an abnormality is detected in the supplied electric power and to disable the gap control when an abnormality is detected in the supplied electric power, it is possible to provide an inexpensive configuration capable of preventing the processing nozzle from hitting the workpiece in the event of a power outage, etc.

DETAILED DESCRIPTION

Figure 1:
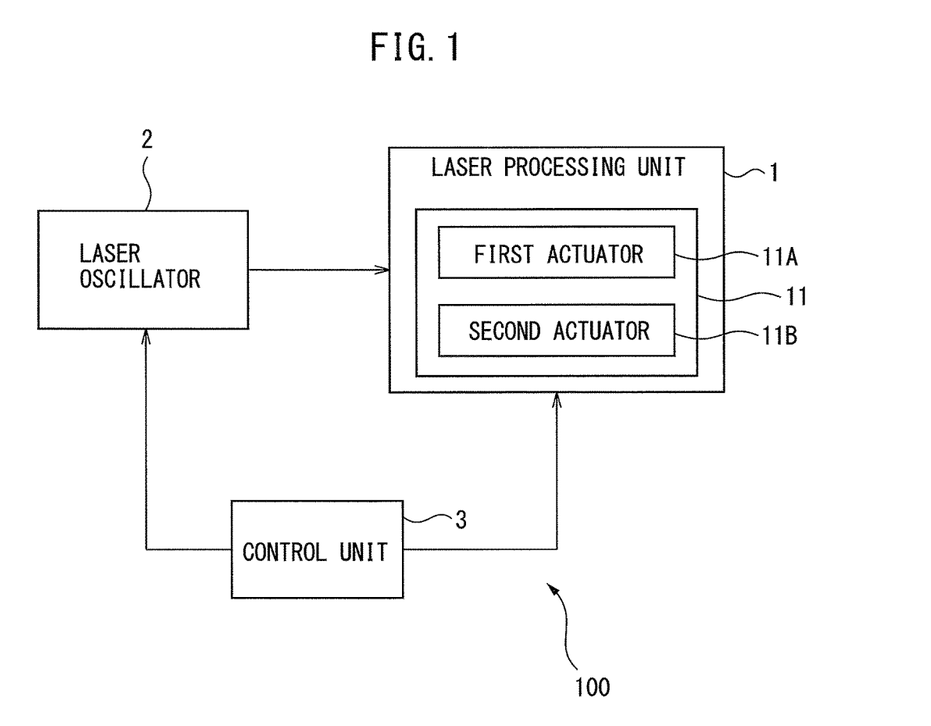
FIG. 1 is a diagram showing the overall configuration of a laser processing apparatus according to one embodiment.

Embodiments of the present invention will be described below with reference to FIGS. 1 to 5. FIG. 1 is a diagram showing the overall configuration of a laser processing apparatus 100 according to one embodiment. The laser processing apparatus 100 includes a laser processing unit 1, a laser oscillator 2 configured to generate laser beam and supply it to the laser processing unit 1, and a control unit (e.g., a numerical control unit) 3 configured to control the laser processing unit 1 and the laser oscillator 2.

The laser processing unit 1 may be a five-axis laser processing unit equipped with a processing nozzle 10 (FIG. 2) for projecting laser beam. The five-axis laser processing unit 1 includes, for example, actuators 11 provided for X axis, Y axis, Z axis, A axis and C axis, respectively, and the processing nozzle 10 is driven by the actuators 11 to move relative to the workpiece W in directions represented by three orthogonal axes (X axis, Y axis and Z axis) and two rotation axes (A axis and C axis). With this configuration, a portion to be processed on the workpiece W is shifted and a desired laser processing is performed on the workpiece W in accordance with a processing program. The laser processing apparatus 100 according to the present embodiment can be widely used in a variety of fields including the processing, medical treatment, measurement, etc.

In laser processing, a distance from the tip of the processing nozzle 10 to the portion to be processed on the workpiece W (hereinafter referred to as a gap) affects the quality of processing. Accordingly, when performing the laser processing, it is required to simultaneously perform the control of the actuator 11 for shifting the portion to be processed on the workpiece W (i.e., a position control) and the control of the actuator 11 for maintaining the gap constant (i.e., a gap control). In the present application, the actuator 11 to be controlled by the position control is referred to as the first actuator 11A, and the actuator 11 to be controlled by the gap control is referred to as the second actuator 11B. For example, when processing the workpiece W disposed on an X-Y plane (see FIG. 2), the X-axis and Y-axis actuators are the first actuators 11A, and the Z-axis actuator is the second actuator 11B.

Figure 2:
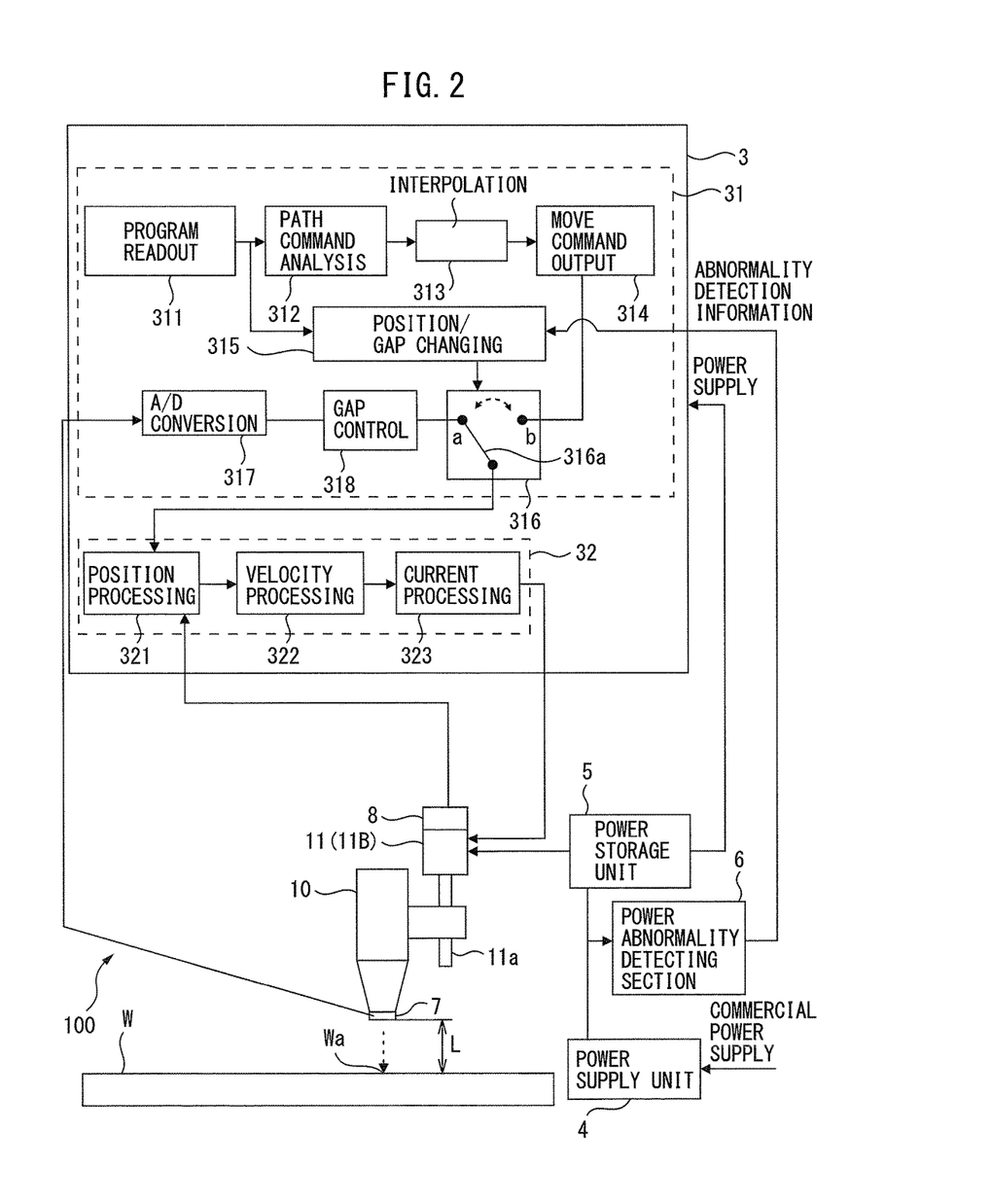
FIG. 2 is a block diagram showing the main control configuration of the laser processing apparatus according to one embodiment.

FIG. 2 is a block diagram showing the main control configuration of the laser processing apparatus 100 according to one embodiment. The laser processing apparatus 100 includes, in addition to the processing nozzle 10 and the control unit 3, a power supply unit 4 connected to a commercial power supply, a power storage unit 5 configured to store electric power supplied from the power supply unit 4, a power abnormality detecting section 6 configured to detect an abnormality in the electric power supplied from the power supply unit 4, and a distance detector 7 configured to detect the gap L. The power abnormality detecting section 6 may be constructed, for example, from an ammeter or voltmeter, and detects the abnormality in power supply when the detected value of current or voltage drops below a predetermined threshold. The distance detector 7 may be constructed, for example, from a noncontact gap sensor.

In FIG. 2, a servo motor for rotating a ball screw 11a is shown as one example of the second actuator 11B (Z-axis actuator). As the ball screw 11a rotates, the processing nozzle 10 moves closer to or away from the portion Wa to be processed on the workpiece W, so as to vary the gap L. The Z-axis position of the processing nozzle 10 is detected by a position detector 8. The position detector 8 may be constructed, for example, from an encoder for detecting the amount of rotation of the servo motor. The first actuator 11A (X-axis actuator and Y-axis actuator) shown in FIG. 1 may also be constructed from a servo motor for rotating a ball screw and may include a position detector such as an encoder.

The electric power from the power storage unit 5 is supplied to the control unit 3. The control unit 3 includes a moving amount calculating section 31 configured to calculate a Z-axis target moving amount of the processing nozzle 10 relative to the workpiece W, and a servo control section 32 configured to control the second actuator (servo motor) 11B in accordance with the target moving amount calculated by the moving amount calculating section 31.

The moving amount calculating section 31 includes a program readout section 311 configured to read out a processing program, a program analyzing section 312 configured to analyze a processing path command contained in the read processing program, an interpolation section 313 configured to perform interpolation on the processing path command analyzed by the program analyzing section 312, an output section 314 configured to output a move command to the servo control section 32, a change control section 315 configured to execute a change between the position control and the gap control, a circuit changing section 316 configured to execute a change between a position control circuitry and a gap control circuitry in response to a command from the change control section 315, an A/D conversion section 317 configured to execute an A/D conversion on a signal output from the distance detector 7, and a gap control circuit 318 configured to execute the gap control based on the signal entered through the A/D conversion section 317 from the distance detector 7.

The gap control circuit 318 outputs a move command as to maintain the gap L at a predetermined target value La in response to a detected value obtained by the distance detector 7. The change control section 315 outputs an ON signal so as to cause a switch 316a provided in the circuit changing section 316 to be switched to a position "a". As a result, a move command from the gap control circuit 318 is entered to the servo control section 32, and thereby the gap control is enabled. On the other hand, the change control section 315 outputs an OFF signal so as to cause the switch 316a in the circuit changing section 316 to be switched to a position "b". As a result, the move command from the gap control circuit 318 is blocked, thereby the gap control is disabled, and the second actuator 11B operates under the control of a position command provided in the processing program.

The processing program given to the program readout section 311 contains a move command for moving the processing nozzle 10 relative to the workpiece W to an initial position prior to starting of the gap control, and a move command for moving the processing nozzle 10 relative to the workpiece W during execution of laser processing (hereinafter referred to as a processing command). Before starting of the gap control, the switch 316a in the circuit changing section 316 is set at the position "b", so that the first and second actuators 11A and 11B (FIG. 1) are controlled in accordance with the move command and the processing nozzle 10 is moved to the initial position. When the positioning of each axis at the processing start position is completed, the change control section 315 outputs an ON command to the circuit changing section 316 in response to a gap control mode ON command written in the processing program. As a result, the switch 316a in the circuit changing section 316 is switched to the position "a", and thereby the move command as the gap control provided for the second actuator 11B is enabled. During the gap control, the first actuator 11A is controlled through the position control in accordance with the processing command, and the processing nozzle 10 is moved relative to the workpiece W accordingly. The processing command does not include a command for driving the second actuator 11B, so that, during the gap control, the second actuator 11B is controlled by the gap control circuit 318.

The servo control section 32 includes a position processing section 321, a velocity processing section 322, and a current processing section 323, and performs a feedback control for the second actuator 11B in accordance with the detected value obtained by the position detector 8. The gap control circuit 318 constitutes a gap control section that cooperates with the servo control section 32 so as to perform the gap control for the second actuator 11B. On the other hand, the program analyzing section 312, the interpolation section 313 and the output section 314 constitute a position control section that cooperates with the servo control section 32 so as to perform the position control for the second actuator 11B. The configuration of a position control section for performing a position control for the first actuator 11A is the same as the configuration of the position control section for controlling the second actuator 11B.

The moving amount calculating section 31 shown in FIG. 2 has a control configuration corresponding to the second actuator 11B. Regarding the first actuator 11A, a gap control is not needed, and thus the change control section 315, the circuit changing section 316, the A/D conversion section 317, and the gap control circuit 318 are omitted. Accordingly, in a moving control section for the first actuator 11A (corresponding to the moving amount calculating section 31), a move command (or a processing command) output from an output section (corresponding to the output section 314) is directly input to a servo control section (corresponding to the servo control section 32), and the first actuator 11A (or the servo motor) is subjected to a feedback-control in accordance with the move command.

Figure 3:
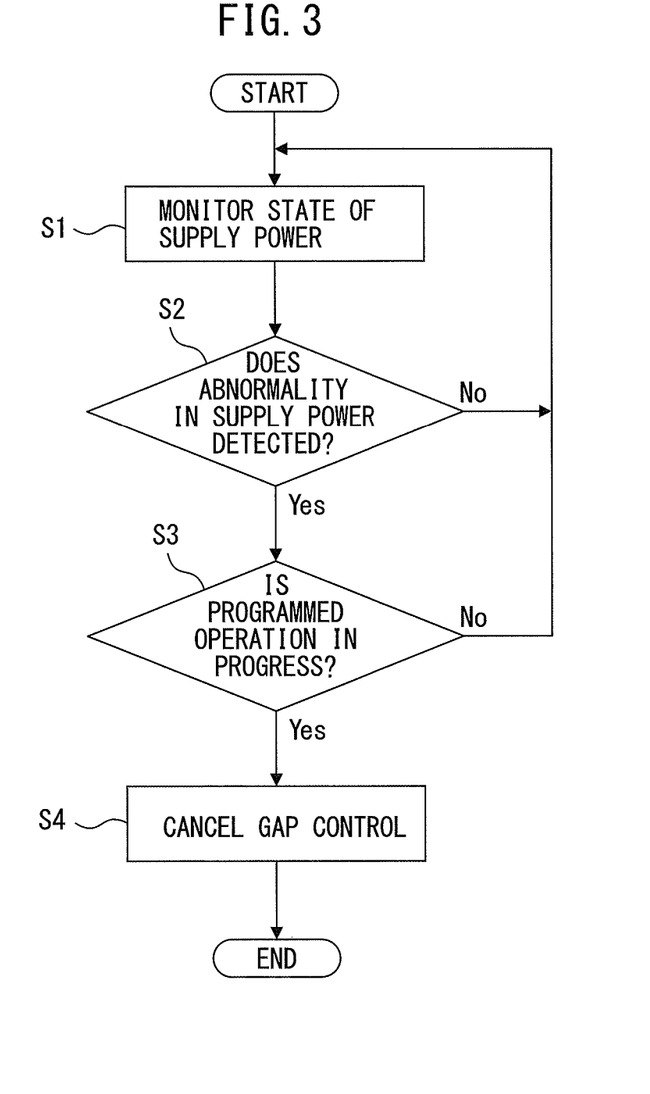
FIG. 3 is a flowchart illustrating one example of a process performed by a change control section in the laser processing apparatus of FIG. 2.

FIG. 3 is a flowchart illustrating one example of a process performed by the change control section 315. The process illustrated by the flowchart is started when, for example, a gap control according to a command from the gap control circuit 318 is initiated. Therefore, in an initial state, the change control section 315 outputs an ON signal so as to switch the switch 316a in the circuit changing section 316 to a position "a" and thereby the gap control is enabled.

In step S1, a signal from the power abnormality detecting section 6 is read. In other words, the state of an electric power supply is monitored. In step S2, it is judged whether the power abnormality detecting section 6 has detected an abnormality in power supply or not. If the power abnormality detecting section 6 has detected an abnormality in power supply, the process proceeds to step S3. If the power abnormality detecting section 6 has not detected an abnormality in power supply, the process returns to step S1.

In step S3, it is judged, based on a signal from the program readout section 311, whether the gap control is performed or not, that is, whether a programmed operation (a laser processing according to a processing program) is in progress or not. If the programmed operation is in progress, the process proceeds to step S4. If the programmed operation is not in progress, the process returns to step S1. In step S4, the change control section 315 recognizing the power supply abnormality outputs an OFF signal to the circuit changing section 316. When the OFF signal is output from the change control section 315 to the circuit changing section 316, the switch 316a in the circuit changing section 316 is switched to the position "b", and thereby the gap control is disabled or canceled.

The main operation of the laser processing apparatus 100 according to the present embodiment will be described below. During the execution of the programmed operation, the move command for the first actuator 11A is output based on the processing program, and the first actuator 11A is controlled through a feedback control (or a position control) based on the signal from the position detector. With this operation, the processing nozzle 10 is moved relative to the workpiece W, and the portion Wa to be processed on the workpiece W is shifted.

During the above state, predetermined electric power is supplied to the power supply unit 4. The switch 316a in the circuit changing section 316 is set to the position "a", so that the second actuator 11B is controlled by the move command from the gap control circuit 318. The second actuator 11B is controlled through a feedback control (or a gap control) based on the signal from the position detector 7. With this operation, the gap L is maintained constant during the execution of laser processing, and the portion Wa to be processed is irradiated with the laser beam supplied from the laser oscillator 2 with a constant intensity, so that it is possible to perform high-quality laser processing on the workpiece W.

If a power supply to the laser processing unit 1 is cut off due to a power outage, etc., the power abnormality detecting section 6 detects an abnormality in the power supply. According thereto, the change control section 315 outputs an OFF signal to the circuit changing section 316, and the switch 316a is switched to the position "b" (step S4). As a result, the move command from the gap control circuit 318 is blocked, and the gap control is thus disabled.

When the circuit changing section 316 is set to the position "b", the command from the output section 314 is entered to the servo control section 32, and the second actuator 11B comes into condition as to be controlled based on a move command in the processing program (or subjected to a position control). However, the processing program does not include a moving command for the second actuator 11B, and thereby the driving operation of the second actuator 11B stops. Consequently, even if the distance detector 7 malfunctions in the event of a power outage and thereby outputs a gap detection value larger than the predetermined target value La, it is possible to prevent the processing nozzle 10 from being moved closer to the workpiece W and hitting the workpiece W.

In the above embodiment, since the moving command for the second actuator 11B during execution of the gap control is not written in the processing program, the driving operation of the second actuator 11B stops when a power abnormality is detected by the power abnormality detecting section 6. In an alternative configuration, a move command for moving the processing nozzle 10 away from the workpiece W to a predetermined retracted position when a power abnormality is detected by the power abnormality detecting section 6 may be written in advance in the processing program.

Figure 4:
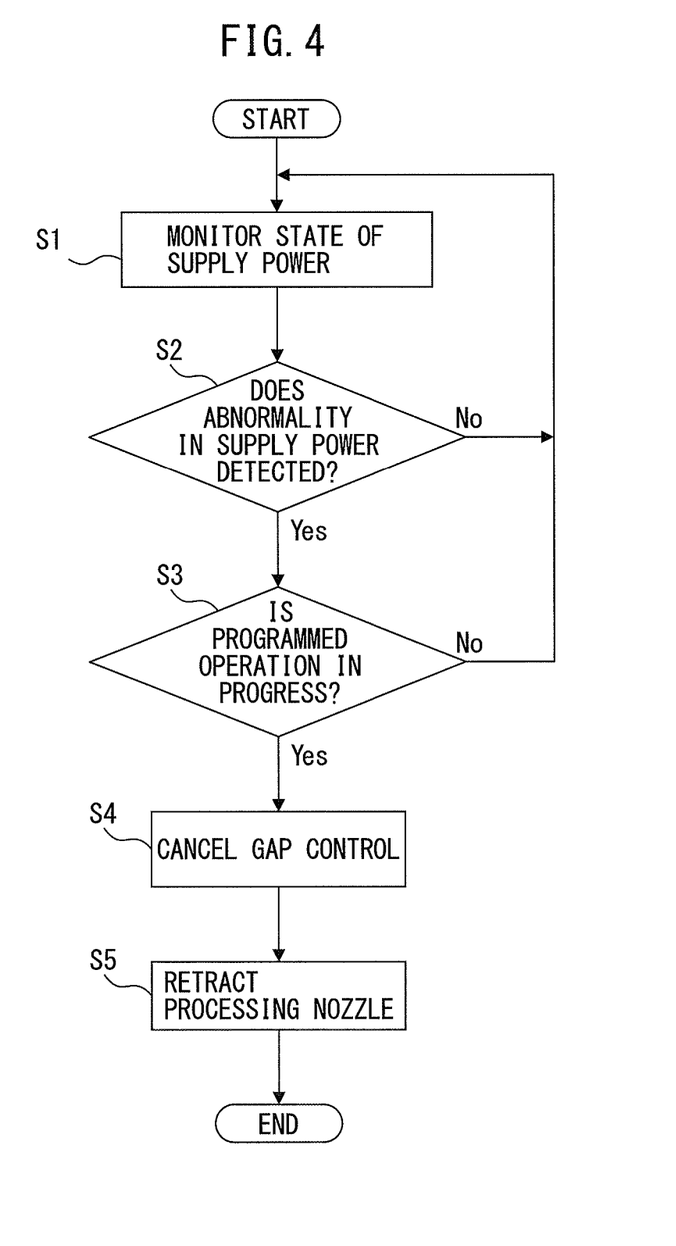
FIG. 4 is a flowchart illustrating a modified example of the process of FIG. 3.

FIG. 4 is a flowchart illustrating one example of a process performed by the moving amount calculating section 31 according to a modified example. It should be noted that the moving amount calculating section 31 includes the change control section 315, and the same steps as those in FIG. 3 are designated by the same numbers.

As shown in FIG. 4, when the gap control is disabled or canceled in step S4, the process proceeds to step S5. In step S5, the output section 314 is outputting a move command (or a positioning command) for the second actuator 11B in accordance with the processing program, and thereby the servo control section 32 controls the second actuator 11B by a position control and causes the processing nozzle 10 to retract to a predetermined position. For example, in a case where the processing nozzle 10 is located above the workpiece W as shown in FIG. 2, the processing nozzle 10 is moved upward to the predetermined position. In this way, the processing nozzle 10 is moved away from the workpiece W, and thereby it is possible to reliably prevent interference between the processing nozzle 10 and the workpiece W. In this configuration, the output section 314 and the servo control section 32 function as a retraction control section configured to move the processing nozzle 10 to a predetermined retracted position in accordance with the processing program when a power abnormality is detected.

In the above configurations, electric power is supplied from the power storage unit 5 to both of the control unit 3 and the second actuator 11B. Accordingly, the processes shown in FIGS. 3 and 4 can be performed even when the supply power from the commercial power supply to the power supply unit 4 is cut off due to a power outage, etc.

The above embodiment achieves the following advantageous effects.

(1) The laser processing apparatus 100 includes the processing nozzle 10 configured to irradiate a workpiece W with laser beam, the actuator 11 configured to move the processing nozzle 10 relative to the workpiece W, the control unit 3 configured to control the actuator 11, the distance detector 7 configured to detect the gap L between the processing nozzle 10 and the workpiece W, the power supply unit 4, and the power abnormality detecting section 6 configured to detect an abnormality in electric power supplied from the power supply unit 4. The control unit 3 includes the gap control circuit 318 configured to control the actuator 11 based on the detected value obtained by the distance detector 7, so as to perform a gap control for adjusting the gap L between the processing nozzle 10 and the portion Wa to be processed on the workpiece W to a target value, the output section 314 configured to output a move command for the actuator 11 so as to change the portion Wa to be processed on the workpiece W in accordance with a processing program while the gap control is performed, and the change control section 315 configured to change the mode of the circuit changing section 316 so as to maintain the gap control in an enabled state until a power abnormality is detected by the power abnormality detecting section 6, and to disable the gap control when a power abnormality is detected by the power abnormality detecting section 6. According to the above configuration, it is possible to provide an inexpensive configuration capable of preventing the processing nozzle 10 from hitting the workpiece W in the event of a power outage, etc. In a configuration for mechanically preventing the processing nozzle 10 from hitting the workpiece W, it is required to provide an extra component. Contrary to this, according to the present embodiment, there is no need to add the extra component, and the laser processing apparatus 100 can be achieved at low cost.

(2) The actuator 11 includes the first actuator 11A controlled in accordance with the processing program and the second actuator 11B controlled by the gap control circuit 18. When the circuit changing section 316 is set to the position "b" in response to a command from the change control section 315, the second actuator 11B operates in accordance with the position command provided in the processing program. Since the laser processing apparatus 100 according to the present embodiment includes the first actuator 11A used for the position control and the second actuator 11B capable of operating by not only a command for the position control but also a command for the gap control, it is possible to readily change the portion Wa to be processed on the workpiece W based on the processing program while performing the gap control.

(3) When a power abnormality is detected by the power abnormality detecting section 6 and the mode of the circuit changing section 316 is changed in response to a command from the change control section 315, the driving operation of the second actuator 11B stops because the moving command for the second actuator 11B during execution of the gap control is not written in the processing program. In this way, the processing nozzle 10 is prevented in a reliable manner from hitting the workpiece W, and thus a safety is enhanced.

(4) In a configuration where, when a power abnormality is detected, the second actuator 11B is controlled by using the power supplied from the power storage unit 5 so as to move the processing nozzle 10 away from the workpiece W to a predetermined retracted position (see FIG. 4), the safety is further enhanced.

In the above embodiment, the distance (the gap L) between the processing nozzle 10 and the portion Wa to be processed on the workpiece W is controlled to a target value (i.e., subjected to a gap control) based on the detected value obtained by the distance detector 7 in accordance with a command from the gap control circuit 318 constituting the gap control section, and while performing the gap control, the portion Wa to be processed on the workpiece W is changed (i.e., subjected to a position control) based on the processing program by a move command (or a processing command) output from the position control section including the program analyzing section 312, the interpolation section 313 and the output section 314. Furthermore, the mode of the circuit changing section 316 is changed in response to a command from the change control section 315, so that the gap control is maintained in an enabled state until a power abnormality is detected by the power abnormality detecting section 6 and the gap control is disabled when a power abnormality is detected by the power abnormality detecting section 6. However, the configuration of the control unit 3 provided as the control section for controlling the actuator 11 is not limited to the above-described configuration.

In the above embodiment, the first actuator 11A controlled by the position control section is separately provided relative to the second actuator 11B controlled by the position control section and the gap control section, but a control mode for the first actuator and the second actuator during execution of the gap control is not limited to the above-described configuration.

Figure 5:
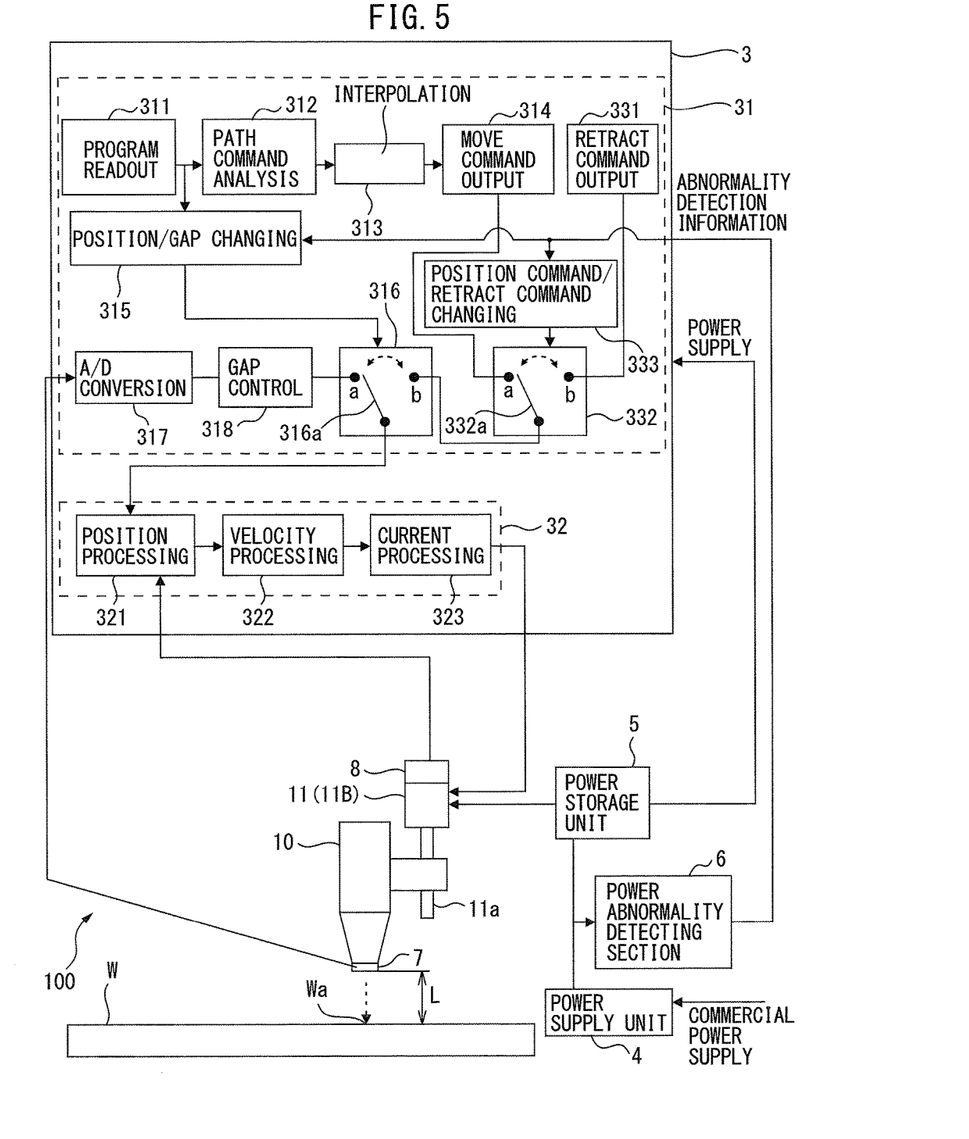
FIG. 5 is a block diagram showing a modified example of the laser processing apparatus of FIG. 2.

In the above embodiment, when a power abnormality is detected, the gap control circuit is changed to the position control circuit so as to stop the output of a move command for the second actuator 11B, and thereby the driving operation of the second actuator 11B is stopped, but alternatively, a stop command may be output to the second actuator 11B upon detection of a power abnormality. In the modified example (FIG. 4), when a power abnormality is detected, the processing nozzle 10 is moved away from the workpiece W to the predetermined retracted position in accordance with the processing program by controlling the second actuator 11B by using the power supplied from the power storage unit 5, but the configuration of a retraction control section is not limited to this configuration. FIG. 5 is a block diagram showing a modified example of the configuration shown in FIG. 2, and more specifically, an alternative configuration of a retraction control section.

As shown in FIG. 5, the moving amount calculating section 31 includes, in addition to the configuration of FIG. 2, an output section 331 configured to output a retract command, a circuit changing section 332 configured to change a circuit so as to output either a position command or a retract command to the servo control section 32, and a change control section 333 configured to change the mode of the circuit changing section 332 so as to perform a changing operation between the position command and the retract command. Before starting the gap control, the change control section 333 sets a switch 332a provided in the circuit changing section 332 at a position "a". Further, before starting the gap control, the switch 316a in the circuit changing section 316 is set at the position "b". As a result, the move command from the processing program is entered to the servo control section 32, so that the second actuator 11B is controlled in accordance with the move command, and the processing nozzle 10 moves to an initial position. During the gap control, in other words, during execution of laser processing, the switch 332a in the circuit changing section 332 is maintained at the position "a", while the switch 316a in the circuit changing section 316 is set at the position "a". If abnormality detection information is output from the power abnormality detecting section 6 during the gap control, the switch 316a in the circuit changing unit 316 is switched to the position "b", and the switch 332a in the circuit changing unit 332 is switched to the position "b" under the control of the change control section 333. As a result, the retract command from the output unit 331 is entered to the servo control section 32, so that the second actuator 11B is controlled by a position control in accordance with the retract command, and the processing nozzle 10 moves away from the workpiece W. In this configuration, the output section 331 and the servo control section 32 function as a retraction control section. Unlike the configuration of FIG. 5, the retraction control section may be provided outside the control unit 3, and the retract command may be provided to the second actuator 11B from outside the control unit 3.

In the above embodiment, the laser processing unit 1 has been described as being a five-axis laser processing unit, but the configuration of the laser processing unit is not limited to the above embodiment. Any configuration other than the five-axis configuration may be employed for the laser processing unit, as long as it is configured to perform processing on the workpiece by irradiating a workpiece with laser beam emitted from the processing nozzle.

While the embodiment of the present invention has been described above, it will be understood by those skilled in the art that various modifications and changes can be made without departing from the scope of the invention as defined by the appended claims.

The invention claimed is:

1. A laser processing apparatus configured to process a workpiece, wherein the apparatus comprises:
   a processing nozzle configured to irradiate a workpiece with laser beam;
   an actuator that moves said processing nozzle relative to the workpiece;
   a distance detector that detects a distance between said processing nozzle and the workpiece;
   a power supply unit;
   a power abnormality detector that detects an abnormality in electric power supplied from said power supply unit; and
   a control unit including a processor configured to:
   control said actuator to perform a gap control for adjusting said distance between said processing nozzle and a part to be processed on the workpiece to a predetermined value based on a detected value obtained by said distance detector, during execution of laser processing;
   control said actuator to perform a position control for changing a position of said processing nozzle relative to the workpiece in accordance with a processing program;
   enable said gap control when a power abnormality is not detected during execution of laser processing by said power abnormality detector; and
   disable said gap control and enable said position control when a power abnormality is detected during execution of laser processing by said power abnormality detector, so as to perform at least one of:
   i) stopping said actuator based on the processing program not including a moving command for said actuator;
   ii) stopping said actuator based on a stop command in the processing program;
   iii) controlling said actuator to retract said processing nozzle based on a move command in the processing program; or
   iv) controlling said actuator to retract said processing nozzle based on a retract command different from a move command in the processing program.

2. The laser processing apparatus of claim 1, further comprising:
   a power storage unit configured to store electric power supplied from said power supply unit; and
   wherein said control unit including said processor is configured to control said actuator by using the electric power supplied from said power storage unit, so as to move said processing nozzle away from the workpiece to a predetermined retracted position, when a power abnormality is detected by said power abnormality detector.

* * * * *